Feb. 18, 1936.  E. A. KOCH  2,031,219
VEHICLE WHEEL INCLOSURE
Filed March 9, 1934
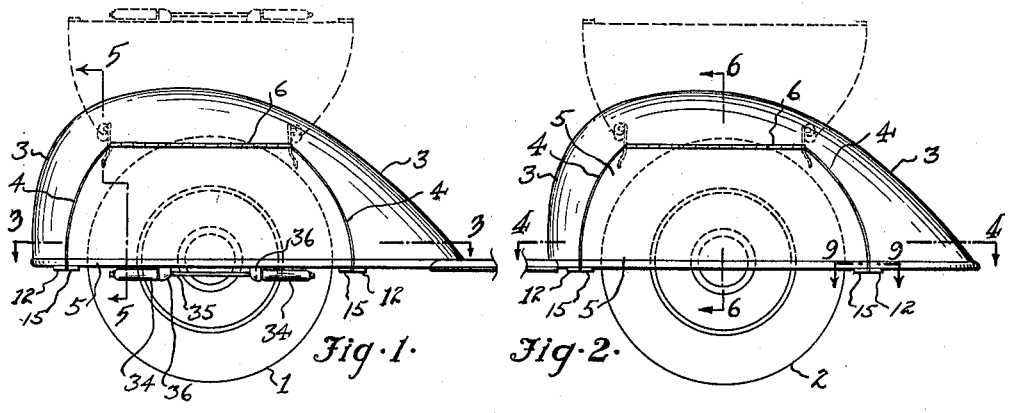
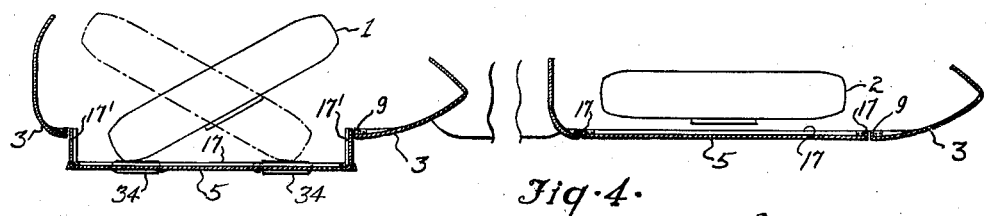
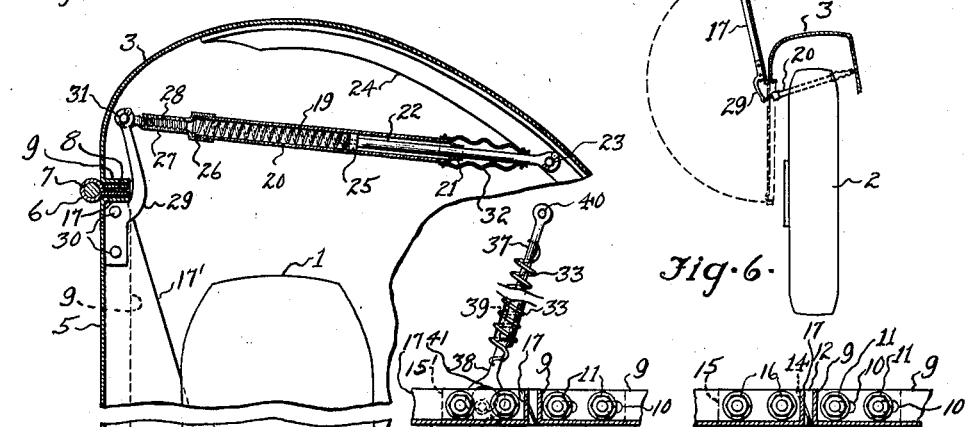
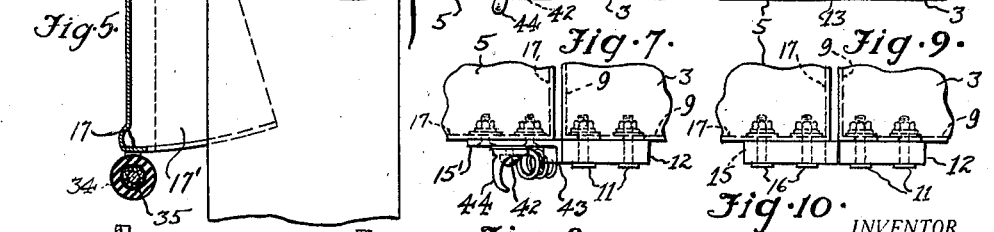
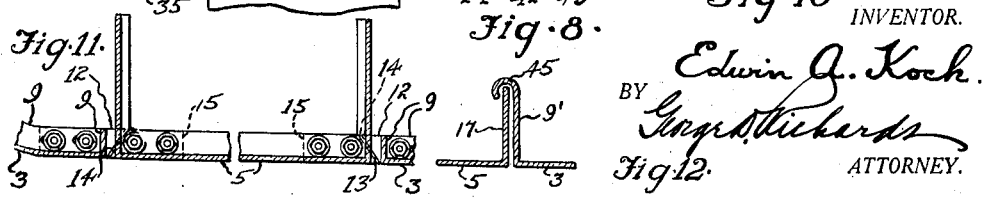
INVENTOR.
Edwin A. Koch.
BY
ATTORNEY.

Patented Feb. 18, 1936

2,031,219

UNITED STATES PATENT OFFICE 2,031,219

VEHICLE WHEEL INCLOSURE

Edwin A. Koch, River Edge, N. J.

Application March 9, 1934, Serial No. 714,772

8 Claims. (Cl. 280—153)

This invention relates, generally, to vehicle wheel inclosures or fenders and the invention has reference, more particularly, to a novel wheel inclosure adapted for use on automobiles, airplanes, railway cars and other vehicles.

Fenders as heretofore generally constructed do not cover the outer sides of wheels, with the result that more or less mud and dirt is splashed on the car body in use, and in those instances where guards have been mounted to cover the outer sides of wheels, such guards are generally difficult to remove in case access to the wheels is desired as when changing tires. Also, such guards usually rattle and are generally more or less unattractive in appearance.

The principal object of the present invention is to provide novel wheel inclosures or fenders that are constructed and arranged so as to provide cover portions or flaps that extend downwardly adjacent the outer sides of the wheels to thereby catch dirt and foreign matter that would otherwise be deposited on the car body, each of the said cover portions or flaps being hinged at its upper edge to the main body of the fender and having its outer surface substantially flush with the outer surface of the fender body, thereby causing the wheel inclosure to have a neat and attractive appearance, the said hinged portion or flap being normally held in its downwardly extending position but being readily and easily raised into an upturned out of the way position when access to the wheel or tire is desired.

Another object of the present invention lies in the provision of a novel wheel inclosure of the above character that is as readily adaptable for use in connection with steered wheels, i. e. ordinarily the front wheels of motor vehicles, as with wheels that are not steered, the said wheel inclosure flap or hinged portion giving way to the steered wheel when the latter is skewed or turned as when going around corners, such hinged flap or portion having flanges at its front and rear edges to complete the covering of the wheel when the same is turned.

Still another object of the present invention is to provide a novel wheel inclosure of the above character that is of simple, reliable construction and dependable in use, the said wheel inclosure being non-rattling and preferably of approximately aerofoil or streamline contour.

Other objects of this invention, not at this time more particularly enumerated, will be clearly understood from the following detailed description of the same.

The invention is clearly illustrated in the accompanying drawing, in which:

Fig. 1 is a fragmentary view illustrating the novel wheel inclosure of this invention applied to the front wheel of a vehicle of the automotive type.

Fig. 2 is a view similar to Fig. 1, but shows the wheel inclosure applied to the rear wheel of an automotive vehicle.

Fig. 3 is a fragmentary sectional view of the wheel inclosure, taken along line 3—3 of Fig. 1 looking in the direction of the arrows, but with the wheel in skewed position.

Fig. 4 is a fragmentary sectional view taken along line 4—4 of Fig. 2 looking in the direction of the arrows.

Fig. 5 is an enlarged vertical sectional view taken along line 5—5 of Fig. 1 looking in the direction of the arrows.

Fig. 6 is a schematic sectional view taken along line 6—6 of Fig. 2, but showing the hinged portion or flap in upturned position.

Fig. 7 is a fragmentary sectional view in plan of a slightly modified detail of construction.

Fig. 8 is a view in elevation of the structure shown in Fig. 7.

Fig. 9 is an enlarged fragmentary sectional view taken along line 9—9 of Fig. 2 looking in the direction of the arrows.

Fig. 10 is a view in elevtation of the structure shown in Fig. 9.

Fig. 11 is a fragmentary view of a portion of the structure of Fig. 3 but with the wheel in its straight ahead position, and Fig. 12 is a fragmentary sectional view showing a slightly modified detail of construction.

Similar characters of reference are employed in said views, to indicate corresponding parts.

Referring now to the said drawing, the reference numeral 1 designates the front or steered wheel of an automotive vehicle, whereas the reference numeral 2 designates the rear wheel of the vehicle. These wheels are illustrated as covered by the novel wheel inclosures of this invention. Each of these wheel inclosures comprises a body portion 3 which is illustrated as having substantially the shape of a fender or mud guard of streamline or aerofoil contour, although it is to be understood that the shape of the body portion 3 is unimportant, for the principles of the present invention are equally applicable to body portions or fenders of any shape and the invention is also applicable to those vehicles wherein the wheel inclosures are a part of the vehicle body itself.

According to the preferred construction, the body portion or fender 3 is provided at its outer side with an opening 4 to permit access to the vehicle wheel and adjacent parts, which opening is normally closed by a hinged cover portion or flap 5. The hinged cover portion or flap 5 is preferably of sheet metal and may be flat or curved somewhat so that its outer surface suitably conforms with the outer surface contour of the body portion 3 as especially shown in Figs. 4 and 11. The peripheral outer surface portion of the flap 5 is substantially flush with the adjoining outer surface portions of the body portion 3 when the flap 5 is in its lower closed position as shown in Figs. 1, 2, 4 and 11, thereby presenting a neat and attractive appearance.

The flap 5 is hingedly connected at its upper edge to the body portion 3 by a hinge 6 having a hinge pin 7. The hinge 6 is shown as of the continuous or piano type although a plurality of separate hinges may be used in lieu of this single hinge if desired. The hinge 6 may be provided with an anti-rattling and water resisting strip 8 of rubber or other suitable material (see Fig. 5) which strip is adhered to one of the hinge plates for contacting with the opposing plate when the flap 5 is in its down turned closed position. If desired, the hinged pintle 7 may be removable, thereby enabling the ready removal of the flap 5 from the body portion 3.

The lower edge of the body portion 3 and the edge of this body portion adjoining opening 4 are illustrated as provided with an inwardly directed horizontal flange 9 (see especially Figs. 5, 9, 10 and 11). The portions of flange 9 at the lower edge of the body portion and adjacent the ends of opening 4 are horizontal and are provided with slots 10 extending longitudinally of the flange 9 (see Figs. 9, 10 and 11). Bolts 11 extend downwardly through the slots 10 and through conforming circular apertures provided in blocks of rubber 12. The blocks of rubber 12 are provided with beveled ends 13 for cooperating with the beveled ends 14 of adjoining blocks 15, which are secured as by bolts 16 to a horizontal inwardly directed flange 17 provided on the flap 5. The bolts 16 extend upwardly through conforming apertures provided in the flange 17. The slots 10 enable the blocks 12 to be adjusted longitudinally i. e. towards or away from blocks 15 so that when the flap 5 is moved downwardly to closed position, the beveled ends 14 of blocks 15 will abut the beveled ends 13 of blocks 12, thereby cushioning the downward closing movement of the flap and preventing rattling thereof when the same is closed.

When the wheel inclosure is used with a wheel that is not steered, for example, the wheel 2 of Figs. 2 and 6, the flap flange 17 preferably extends completely around the periphery of the flap 5 so as to give this flap or cover the desired rigidity and resistance to bending. This flange, being continued around the top of the flap 5, provides a suitable surface to which the lower plate of the hinge 6 is attached, the upper plate of the hinge being attached to the flange 9 of the body portion 3. When the wheel inclosure is used with a steered wheel, as is shown in Figs. 1, 3 and 5, the flap 5 is provided with the flange 17 at its upper and lower edges just as in the case of the non-steered wheel, but the side edges of the flap are provided with tapered flanges 17', i. e. the flanges 17' at the sides of the flap or cover 5 are relatively wide (see Fig. 5) at the bottom of the flap and converge or become narrower toward the top of the flap. This construction prevents the formation of openings between the side edges of flap 5 and the body 3 when the flap 5 is forced outwardly somewhat, as shown in Fig. 3, when the wheel 1 is skewed or turned.

The hinged flap or cover 5 is normally held in closed position by the action of compression springs 19 that are enclosed within cylinders 20 positioned within body portion 3 adjacent the ends of hinge 6. Each cylinder 20 has a reduced end portion 21 that is slidably mounted on a rod 22. Rod 22 has its inner end pivotally mounted on a pin 23 that is fixed to a suitable support such as the fender brace 24. The outer end of rod 22 projects into the open end of cylinder 20 and has a piston 25 fixed thereon, which piston is slidable within cylinder 20. A yoke member 26 is threaded on the outer end of cylinder 20 and has a reduced portion 27 into which an eye-screw 28 is threaded. Spring 19 bears at one end against the yoke member 26 and at its other end against piston 25.

Arms 29 are shown as attached as by rivets 30 to the upper portions of the flanges at the side edges of the flaps 5. Thus, the arms 29 are attached to flanges 17' of flaps 5 used for steered wheels whereas, the arms 29 are attached to flanges 17 of flaps 5 used for wheels that are not steered. The free ends of arms 29 are pivotally connected by pins 31 to the eye screws 28. The pressure of springs 19 acting through yoke members 26, eye-screws 28 and arms 29, serves to urge flap 5 in a counterclockwise direction as viewed in Fig. 5, thereby normally holding the flap in closed position with blocks 15 firmly abutting the stop blocks 12. When it is desired to obtain access to the wheel it is merely necessary to grasp flap 5 at its lower edge and turn the same upwardly as shown in Fig. 6. During the upward movement of the flap 5, the arms 29 first act to further compress springs 19 and then these arms pass through a dead center position with respect to hinge pin 7 and pin 23, whereupon the tension on springs 19 is relieved somewhat so that these springs serve, by urging the flap 5 in a clockwise direction about hinge pin 7, to hold the flap in its upturned position, thereby enabling maximum access to the wheel. When it is desired to again close the opening 4 it is merely necessary to turn the flap 5 downwardly, the springs 19 acting to hold the flap in closed position.

The cylinders 20 serve to protect the springs 19 from dirt and other foreign matter. Preferably a bellows 32 of leather or other flexible material is connected to the inner end of each cylinder 20 and overlies the rod 22 to exclude foreign matter from interfering with the operation of springs 19. By removing pins 31 and turning eye-screws 28 within yoke members 26 the tension of springs 19 may be varied.

In use, when the wheel 1 is turned or skewed as when going around a corner, the peripheral corner or angle of the tire will engage the flap 5 thereby causing this flap to turn outwardly somewhat about its hinge pintle 7 as shown in Fig. 3. In order to reduce the friction between the tire and the flap 5, rollers 34 are shown as turnably mounted upon a rod 35 carried by brackets 36 attached to flap 5, which rollers are engaged by the corner of the tire when the latter is skewed. The brackets 36 are shown in Fig. 1 as extending downwardly from flap 5 causing rollers 34 to be exposed to view, but it is to be understood that these brackets may extend inwardly instead of downwardly, in which case the rollers 34 would be hidden from normal view. Owing to the presence of flanges 17', the skewing of the wheel 1 does not cause openings to be formed between the side edges of flap 5 and the body portion 3 and hence the wheel is covered at all times, whether turning or going straight ahead (see Figs. 3 and 11). As the wheel is again straightened out after making a turn, the springs 19 act to move flap 5 to closed position.

If desired, instead of using springs 19 and their associated parts for holding the flap 5 in closed condition, use may be made of the modified construction shown in Figs. 7 and 8. In these figures, tension springs 33 are employed, one of these springs being located at each end of the flap 5. Each of these springs 33 has one end thereof attached as by welding, to a rod 37, the other end of the spring 33 being attached to a fitting 38. Fitting 38 has a guiding recess 39 into which the outer end of rod 37 slidingly projects. The inner end of rod 37 is pivotally mounted on a pin 40 that is carried by a suitable bracket (not shown) affixed to the vehicle chassis.

Fitting 38 has a vertical aperture 41 in its outer end portion for engaging a headed pin 42 depending from the flap 5. In Figs. 7 and 8 the rubber block 15 has been replaced by a metal plate 15' having a depending beveled flange 43 for engaging the rubber stop block 12 carried by the body 3. The headed pin 42 is shown as depending from the plate 15'. Fitting 38 has a finger hook 44 at its outer end, such finger hook being positioned within convenient reach of a person standing at the side of the wheel. By pulling outwardly and then downwardly upon the finger hooks 44, the fittings 38 may be disengaged from the pins 42, whereupon the flap 5 may be raised enabling ready access to the wheel. After again lowering the flap 5 and then engaging fittings 38 over pins 42, the springs 33, by pulling upon pins 42, will serve to hold plates 15' firmly against stop blocks 12, thereby preventing any rattling or looseness of the flap 5.

If desired, the flange 9 of the body portion 3 may be provided with a turned over edge that overlies the edge of the flap flange 17, thereby providing a seal to prevent the entrance of water and foreign matter between the flanges 9 and 17. This is illustrated in Fig. 12 wherein the flange 9' on the body member or fender 3 has a turned over portion 45 that overlies the edge of flange 17 and hence serves to prevent flying water and dirt from becoming lodged between flanges 9' and 17.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:—

1. In a wheel inclosure of the character described, a body portion extending over the wheel, said body portion having an opening therein adjacent the outer side of the wheel for enabling access to the wheel, a flap for normally fully closing said opening, said flap being hingedly connected at its upper edge by a horizontal hinge to said body portion, and releasable spring means connected at one end to said flap and acting to urge said flap inwardly about its hinged connection for yieldably holding said flap in closed position.

2. In a wheel inclosure of the character described, a body portion extending over the wheel, said body portion having an opening therein adjacent the outer side of the wheel for enabling access to the wheel, a flap for normally fully closing said opening, said flap being hingedly connected at its upper edge along a substantially horizontal line to said body portion, and releasable spring means for yieldably holding said flap in closed position, the manual turning of said flap upwardly against the resisting tension of said spring means, serving to cause said spring means to hold said flap in its upturned out of the way position.

3. In a wheel inclosure of the character described, a body portion extending over the wheel, said body portion having an opening therein adjacent the outer side of the wheel for enabling access to the wheel, a flap for normally fully closing said opening, said flap being hingedly connected at its upper edge along a substantially horizontal line to said body portion, and releasable spring means for yieldably holding said flap in closed position, the manual turning of said flap upwardly against the resisting tension of said spring means, serving to cause said spring means to hold said flap in its upturned out of the way position, said flap and said body portion having cooperable cushion stop members that are operable upon the closure of said flap to eliminate rattling of said flap.

4. In a wheel inclosure of the character described, a body portion extending over the wheel, said body portion having an opening therein adjacent the outer side of the wheel for enabling access to the wheel, a flap for normally closing said opening, said flap being hinged at its top to said body portion, said body portion and said flap having cooperable stops provided with beveled portions for properly centering said flap with respect to said body portion when said flap is closed, and yieldable fastener means for holding said flap in closed position.

5. In a wheel inclosure of the character described, a body portion extending over the wheel, said body portion having an opening therein adjacent the outer side of the wheel for enabling access to the wheel, a flap for normally fully closing said opening, said flap being hinged at its top to said body portion, and yieldable fastener means for holding said flap in closed position, said fastener means yielding under the pressure of the wheel when the same is skewed to permit outward turning movement of said flap, said flap having flanges at its sides to complete the covering of the wheel when the same is skewed.

6. In a wheel inclosure of the character described, a body portion extending over the wheel, said body portion having an opening therein adjacent the outer side of the wheel for enabling access to the wheel, a flap for normally fully closing said opening, said flap being hinged at its top along a horizontal line to said body portion, and yieldable fastener means for holding said flap in closed position, said fastener means yielding under the pressure of the wheel when the same is skewed to permit outward turning movement of said flap, said flap having anti-friction means thereon engageable by said wheel when the latter is skewed, whereby the frictional resistance between said flap and the wheel is reduced to a minimum.

7. In a wheel inclosure of the character described, a body portion extending over the wheel, said body portion having an opening therein adjacent the outer side of the wheel for enabling access to the wheel, a flap for normally closing said opening, said flap being hinged at its top to said body portion, said body portion and said flap having cooperable stops provided with beveled portions for properly centering said flap with respect to said body portion when said flap is closed, and yieldable fastener means for holding said flap in closed position, said fastener means yielding under the pressure of the wheel when the same is skewed to permit outward turning movement of said flap, said flap having flanges at its sides to complete the covering of the wheel when the same is skewed, and having rollers thereon positioned to be engaged by the wheel when the same is skewed, thereby lessening the frictional resistance between said wheel and said flap.

8. In a wheel inclosure of the character described, a body portion extending over the wheel, said body portion having an opening therein adjacent the outer side of the wheel for enabling access to the wheel, a flap for normally closing said opening, said flap being hinged at its top to said body portion, and yieldable fastener means for holding said flap in closed position, said fastening means comprising a compression spring, a housing for said spring, a plunger having its inner end pivotally associated with said body portion and its outer end projecting slidingly into said housing for engaging one end of said spring, an arm on said flap, and a yoke member pivotally connected at its outer end to said arm and having its inner end connected to said housing for engaging the other end of said spring, said fastening means serving to yieldably hold said flap closed when the same is in its down-turned position and also serving to hold said flap open when the same is in its up-turned position.

EDWIN A. KOCH.